3,162,623
CROSSLINKING OF POLYMERS WITH NITROGEN FLUORIDES

Theodore L. Cairns and Charles S. Cleaver, Wilmington, Del., assignors to E. I. du Pont de Nemours and Company, Wilmington, Del., a corporation of Delaware
No Drawing. Filed Dec. 26, 1961, Ser. No. 162,235
17 Claims. (Cl. 260—87.7)

This invention relates to a method for modifying polymers and to the resulting products.

This application is a continuation-in-part of copending application, Ser. No. 839,276, filed September 11, 1959, and now abandoned.

Many polymers have attained commercial success because they possess a desirable combination of properties for certain uses. It is believed that the fields of usefulness of these polymers would be further expanded if an economical method were found for modifying certain properties of these polymers. This invention provides such a method.

By the process of this invention, at least one of the following changes in properties of a polymer of the type described below, is brought about by treating said polymers with a nitrogen fluoride: increased softening temperature, decreased solubility, and decreased swellability. Other modifications brought about by this treatment are described hereinafter.

The nitrogen fluorides used in the process of this invention include dinitrogen difluoride ($N_2F_2$), dinitrogen tetrafluoride ($N_2F_4$), and nitrogen fluorides of the general formula:

wherein $X_1$ and $X_2$ are selected from the group consisting, individually, of fluorine and monovalent perfluorocarbyl radicals, and, taken together, of divalent perfluorocarbyl radicals.

These nitrogen fluorides are made by known methods. Thus, $NF_3$ is the chief product in the electrolysis of molten ammonium acid fluoride ($NH_4HF_2$) with a graphite anode at 125° C. (J. H. Simons, "Fluorine Chemistry," Academic Press, Inc., New York, N.Y. (1950), pp. 85–86). $N_2F_2$ can be made by heating $N_3F$ at 25°–100° C. under reduced pressure, and the perfluoroaliphatic hydrocarbon-substituted nitrogen fluorides by the methods of U.S. 2,519,983, J. Chem. Soc. 1951, 102; ibid., 1949, 3080; or J. Am. Chem. Soc. 74, 710 (1952). $N_2F_2$ produced by the above method consists of a mixture of the two stereoisomeric forms, i.e., the cis and trans forms, and the mixture or either isomer in pure form may be used. The isomeric mixture may be resolved by gas chromatography over activated alumina at 0° C. By this method there is obtained a product which is a clear liquid at −196° C. and which is believed to be the cis form. There is also obtained a product which at −196° C. is a white solid and which is thought to be the trans form.

The mixtures of the two isomers as generally obtained or mixtures of one or both of the isomers with other binary fluorides of nitrogen and/or with inert gases such as $CF_4$, nitrogen, helium, and the like, or with air, can also be used in treating polymers according to the process of the invention.

Specific examples of nitrogen fluorides which are operative in the process of the present invention include cis- and trans-dinitrogen difluoride ($N_2F_2$), nitrogen trifluoride ($NF_3$), dinitrogen tetrafluoride ($N_2F_2$), trifluoromethyldifluoronitride, bis(trifluoromethyl)fluoronitride, pentafluoroethyldifluoronitride, heptafluoropropyldifluoronitride, undecafluorocyclohexyldifluoronitride, perfluoropiperidine, perfluoro-2,6-dimethylpiperidine, and the like. Mixtures of the above and mixtures of the above with perfluorocarbons and with inert gases can be used to modify the polymers in accord with this invention.

The process of this invention is applicable to a wide variety of polymers that contain carbon-hydrogen linkages and are soluble in organic solvents, swelled by organic solvents, and/or fusible. The effects of the process are usually most pronounced in polymers that contain amorphous regions. Suitable polymers include the normally solid polyethylenes (both high- and low-density) and polypropylenes; copolymers of ethylene with carbon monoxide and such typical vinyl monomers as propylene and vinyl acetate; polyvinyl acetate, polyvinyl alcohol, and polyvinyl fluoride; polyacrylonitrile and copolymers of acrylonitrile with such typical vinyl monomers as methyl acrylate; vinylidene fluoride/hexafluoropropylene copolymers and vinylidene fluoride/hexafluoropropylene/tetrafluoroethylene terpolymers; and polytetramethylene ether glycol/4,4'diisocyanatodiphenylmethane/1,4-diaminopiperazine terpolymers. Because of the pronounced, easily controllable effects that can be produced in them by treatment with nitrogen fluorides, preferred polymers are polyethylene, copolymers of ethylene, especially those containing at least 30% by weight of combined ethylene, and polypropylene. Within this group, polyethylene is especially preferred.

The method of preparation of the polymer to be treated is not critical. The polymer can be an addition or condensation polymer. Furthermore, addition polymers made with a wide variety of initiators, e.g., peroxides, azonitriles, redox systems, and coordination catalysts, are operable. The process is preferably applied to polymer that is essentially free from monomer.

Polymers can be treated by the process of this invention in any form, e.g., as shaped objects, in bulk, or in solutions. However, since shaping (fabricating) of the polymer normally becomes more difficult after treatment with the nitrogen fluoride, polymers are usually treated in the form of shaped objects, e.g., as films, fibers, or tubes, and this method constitutes a preferred embodiment of the invention.

The conditions as to time, temperature, pressure, and amount of the nitrogen fluoride used in the practice of this invention vary between wide limits depending upon the polymer treated, the physical form of the polymer, the particular nitrogen fluoride used, and the desired end result. Ordinarily, operable polymers are treated at contact times of at least one minute and temperatures from 50° C. up to 200° C. or higher. For example, films of polyethylene and polyvinyl fluoride are preferably treated with $N_2F_2$ at temperatures of 50–150° C. and especially 75–100° C. for 30 minutes or more to bring about the desired modification, such as increase in softening temperature and/or decrease in the solubility or swellability of the polymer. When the less reactive nitrogen fluorides, e.g., $NF_3$, are used, the required temperature and time of contact are higher. Less reactive polymers, for example, copolymers of hexafluoropropylene, require more vigorous treatment, such as at temperatures of 175–200° C. or even up to 300° C. for one hour or even more.

The temperature at which the treatment is effected is determined not only by the reactivity of the polymer but also by the thermal stability of the particular nitrogen fluoride used. Thus, $N_2F_2$ is preferably used at 0–125° C. because within this range the desired effects are produced without adversely affecting other polymer properties and because $N_2F_2$ may decompose violently above about 150° C., especially if used in high concentration.

However, $NF_3$ is thermodynamically very stable and can be used for the purpose of this invention at high temperatures, e.g., 300° C. or even higher.

The pressure at which the process of this invention is carried out is not critical and may vary from subatmospheric to superatmospheric. In some instances, it is convenient to operate at slightly reduced pressure, e.g., 500–700 mm. of mercury.

The amount of nitrogen fluoride used in carrying out the process of this invention depends on the nature and physical form of the polymer, the particular nitrogen fluoride employed, and the degree of modification desired in the preformed polymer. Thus, small amounts of a nitrogen fluoride (0.001 to 2% based on the polymer) often suffice to give a desired degree of surface modification of formed polymer objects such as fibers, films, tubes, or massive objects. A greater amount of the nitrogen fluoride, e.g., 2–10%, is used to modify the complete polymer mass as in the curing of an elastomer. Generally from 0.1 to 10% of nitrogen fluoride is all that is required to give polymers that are markedly less soluble or swellable and that have higher softening temperatures than the corresponding untreated polymers. As indicated in the subsequent examples, however, higher amounts of nitrogen fluoride can be used.

Ordinarily, for a given polymer and a given nitrogen fluoride, under given conditions of temperature, pressure and amount of nitrogen fluoride, the treatment is carried out for at least a time sufficient to confer an increase in softening temperature of 25° C. and/or a readily detectable decrease in solubility or swellability of the polymer. Softening temperature and solubility and swellability are discussed in more detail below.

The nature of the chemical reaction that occurs is not fully understood, but the reaction is believed to involve a crosslinking of the polymer. This reaction causes modification of the polymer, which can be manifested by the above-mentioned increased softening temperature, decreased solubility, and/or decreased swellability.

An increase in softening temperature can be indicated by an increase in zero-strength temperature and/or sticking temperature.

Zero-strength temperature is determined as follows: A piece of film about 1½" long, ¼" to ⅓" wide and 1–5 mils thick is hung at its middle over a cylindrical rod of about 1" O.D. To each end of the film strip is attached a 3.5-g. weight. The rod is heated at a rate not exceeding 2° C. per minute, and its temperature is measured by a thermocouple. The temperature at which one or both halves of the film, with attached weights, fall off the bar is defined as the zero-strength temperature, i.e., the temperature at which the film has zero tensile strength under these conditions. For the most accurate comparisons, zero-strength temperatures of two or more films, e.g., a film treated with a nitrogen fluoride and an untreated control, are measured at the same time on the same rod.

Sticking temperature is defined as the temperature at which a solid polymer sample will leave a molten trail when moved across a heated brass block. It is determined on a brass block the temperature of which can be accurately measured by a thermometer or thermocouple; the block is heated at a rate slow enough to insure a uniformly increasing temperature at its top surface, and the polymer sample is repeatedly moved across the top surface until it leaves a molten trail.

Increases in zero-strength temperature and sticking temperature of as much as 100–180° C. can be produced by the process of this invention, the exact increase depending on the polymer, the nitrogen fluoride, and the conditions of treatment, among other factors. Increases of this order profoundly affect the properties of shaped objects. For practical purposes increases as little as 25° C. can produce an easily detectable, desirable effect.

Decrease in solubility or swellability of a polymer in a given liquid is determined by inspection. It is well known to those skilled in the art that a polymer may be completely dissolved in a given liquid, swelled to varying extent, or completely insoluble therein. The process of this invention can produce easily visible decreases in the solubility and/or swellability of a polymer.

Other changes in polymer properties which may occur are decreased thermoplasticity, increased hardness, increased receptivity to printing inks, increased adhesiveness, increased solvent resistance, increased stability, increased resistance to soiling or dirt collection, and, especially for elastomeric polymers, increased elasticity, increased stiffness, and increased tensile strength.

The following examples illustrate the process of this invention.

EXAMPLE 1

Several ½" x 3" strips of 3-mil polyethylene film, each weighing 60 mg., were placed in a 17-cc. glass vessel closed on the top with a stopcock and ball joint. The apparatus was evacuated and filled to 640 mm. pressure with 36–40 mg. of cis-$N_2F_2$. The vessel was suspended for 45 minutes in a water bath whose temperature was 80°–85° C. During this time, the films became slightly tan. Gas chromatography of the gas mixture at this time showed that the mixture was 29% $N_2$/air and 68% cis-$N_2F_2$. The tube was placed in a bath for another 30 minutes at 80°–85° C. Gas chromatography now showed that the gas was 26% air/$N_2$ and 73% cis-$N_2F_2$, suggesting that very little reaction was occurring after the original 45 minutes. During the experiment 9–10 mg. of $N_2F_2$ was consumed.

The film strips were removed. A piece of the treated polyethylene failed to dissolve in boiling xylene, but swelled slightly. The zero-strength temperature of the treated film was 213° C. versus 104° C. for the untreated control. The control polymer was completely soluble in boiling xylene.

EXAMPLE 2

2-mil strips of polyethylene film (60 mg.) were treated for 45 minutes at 80° C. with 36–40 mg. of trans-$N_2F_2$ in the manner of Example 1. The treated film was insoluble in boiling xylene, a solvent for the untreated polyethylene. The gas, after treatment of film, analyzed 3% $N_2$/air and 95% trans-$N_2F_2$. During the treatment 2 mg. of $N_2F_2$ was destroyed.

EXAMPLE 3

Strips of polyethylene and polyvinyl fluoride films (1.5 mils thick and weighing 60 mg.) were treated as previously with 36–40 mg. of cis-$NF_2$ at 80° C. for 45 minutes. The films became very light tan. During the treatment 5–6 mg. of $N_2F_2$ was consumed. The polyethylene was insoluble in boiling xylene, although swollen by this solvent.

The polyvinyl fluoride swelled slightly in hot dimethylformamide and γ-butyrolactone, and retained most of its original strength. The untreated polyvinyl fluoride film did not dissolve, but formed a pulpy, gel-like mass in hot dimethylformamide and γ-butyrolactone.

EXAMPLE 4

Several ½" x 2½" x 3 mil films were made from a 60/40 (weight ratio) 1,1-difluoroethylene/hexafluoropropylene copolymer. This copolymer was soluble in acetone and of inherent viscosity ($\eta_{inh}$) 0.95. Four of the films, each weighing 0.10 g., were treated as in Example 1 for one hour at 80° C. with cis-$N_2F_2$ at a pressure of 600 mm. During the experiment, 11 mg. of the $N_2F_2$ was consumed. The treated films were unchanged in color but became very elastic and much stronger than untreated controls. The treated films were insoluble in acetone.

As an example of other methods of crosslinking, vinylidene fluoride/hexafluoropropylene (60/40) copolymer is irradiated by accelerated electrons. Crosslinking occurring during irradiation causes development of increased infrared absorption at 5.85µ characteristic of the presence of fluorinated double bonds. Subsequent heat treatment of the irradiated samples causes a substantial increase in state of cure accompanied by increase in the infrared absorption band with 5.85µ and the development of strong new bands at 5.95, 6.1, 6.2, and 6.3µ. These new bands are believed due to unsaturated centers which promote the subsequent degradation of the polymer by heating.

Crosslinking of vinylidene fluoride/hexafluoropropylene (60/40) copolymer by means of $N_2F_2$, on the other hand, does not lead to increase in the infrared absorption at 5.85µ. Nor does the spectrum of the crosslinked material change substantially on heat treatment, showing that this method of crosslinking does not introduce heat-unstable centers into the polymer. Thus, $N_2F_2$-cured vinylidene fluoride/hexafluoropropylene (60/40) copolymer is more resistant to heat degradation than the same copolymer cured by heretofore known methods.

EXAMPLE 5

A copolymer composed of 60 parts of 1,1-difluoroethylene and 40 parts of hexafluoropropylene was formulated as indicated in the following table and pressed into films 5–10 mils thick. Portions of the films were exposed to $N_2F_2$ at 600 mm. pressure and 100° C. for 0, 1, and 3 hours and tested, both with and without additional curing, as shown in the table on the following page.

EXAMPLE 6

Two ⅓″ x 2″ x 3-mil strips of film of vinylidene fluoride/hexafluoropropylene (60/40) copolymer, two similar polyvinylidene fluoride films, and two similar polyvinyl fluoride films were treated with $N_2F_2$ in the apparatus Example 1 at 80–85° C. and atmospheric pressure for 45 minutes. No color changes were observed.

The treated vinylidene fluoride/hexafluoropropylene copolymer films were snappier and tougher than untreated controls and were insoluble in acetone, and one strip had a zero-strength temperature of 256° C. An untreated control was soluble in acetone and had a zero-strength temperature of 145° C.

A treated polyvinylidene fluoride film had a zero-strength temperature of 226° C., compared with a value of 179° C. for an untreated control.

Both treated and untreated polyvinyl fluoride films were insoluble but swollen in hot dimethylformamide. However, the treated film was much stronger in the swollen state than the untreated film.

EXAMPLE 8

Two ½″ x 2″ x 4-mil films of polyvinyl acetate were treated in the apparatus of Example 1 with $N_2F_2$ at 100° C. and atmospheric pressure for 45 minutes. A treated film had a zero-strength temperature of 334° C., compared with a value of 172° C. for an untreated control.

EXAMPLE 9

A 4″ x 12″ x 1-mil polyethylene film was placed on a piece of filter paper of like size, and the system was formed into a loose roll, placed in a closed vessel, and treated for one hour at 550 mm. pressure and 75–85° C. with 320 mg. of $N_2F_2$. The $N_2F_2$ was a mixture which contained 35% of the trans isomer, 64% of the cis isomer, and a trace of $N_2O$. Approximately 120 mg. of the $N_2F_2$ was consumed by the treatment. The treated polyethylene film was insoluble in boiling xylene, a solvent for the untreated polyethylene, and it had improved receptivity to printing inks.

EXAMPLE 10

About 86 g. of ethylene and 0.5 g. of $NF_3$ were heated for one hour at 50° C., one hour at 100° C., and one hour at 150° C. at 900 atmospheres in a 200-ml. stainless steel pressure reactor. There was obtained 12.5 g. of white, tough polymer having a sticking point of about 107° C. The polymer did not melt at 200° C. but the cooled gel would cold-draw. A film was pressed from a portion of the polymer at 5000 lb./sq. in. and 160° C. in one minute. The film was clear, colorless, tough, cold-drawable, and completely soluble in hot xylene. The film had a sticking point of 116–120° C. and a zero-strength temperature of 117° C.

Two strips of the above film (each weighing about 100 mg. and measuring 1½″ x ¼″ x 13 mils) were treated as in Example 1 with $N_2F_2$ at 100° C. for 80 minutes. The films became light tan and were completely insoluble in hot xylene, even failing to be appreciably swollen by this solvent. The zero-strength temperature of the film was now 296° C. and the sticking temperature was above 300° C.

EXAMPLE 11

A piece of polyethylene film measuring 1½″ x ⅓″ x 3 mils was treated by the procedure of Example 1 except that a mixture composed of 89% $NF_3$, 5% trans-$N_2F_2$, 4% cis-$N_2F_2$, 1% $N_2F_4$, and 1% inert gases was used at 100° C. for one hour. The polyethylene film was not visibly changed by this treatment. However, the treated film, though greatly swollen, was insoluble in hot xylene,

*Table.—60/40 1,1-Difluoroethylene/Hexafluoropropylene Cured With $N_2F_2$*

| Test No. | C | | D | | E | | |
|---|---|---|---|---|---|---|---|
| Parts copolymer | 100 | | 100 | | 100 | | |
| Parts carbon black | | | 18 | | | | |
| Parts MgO | 15 | | 15 | | | | |
| Hrs. exposure to $N_2F_2$ at 100° C.[1]: | 1 | 3 | 1 | 3 | 0 | 1 | 3 |
| Tensile strength at break, lb./sq. in. | 1,020 | 1,050 | 1,840 | 1,750 | 200–300 | 1,000 | 850 |
| Elongation at break, percent | 640 | 535 | 500 | 400 | 500–600 | 700 | 620 |
| Modulus at 100% elongation, lb./sq. in. | 160 | 125 | 260 | 290 | 150 | 120 | 100 |
| Additional oven cure, 18 hrs. at 200° C.: | | | | | | | |
| Tensile strength at break, lb./sq. in. | 1,570 | 1,600 | 1,950 | 1,920 | | 800 | |
| Elongation at break, percent | 545 | 430 | 410 | 355 | | 620 | |
| Modulus at 100% elongation, lb./sq. in. | 130 | 160 | 225 | 290 | | 100 | |

[1] 0.8% $N_2F_2$ based on weight of compounded polymer was consumed in the 1-hr. exposures. 1.6% $N_2F_2$ based on weight of compounded polymer was consumed in the 3-hr. exposures.

EXAMPLE 7

Two pieces of ½″ x 2″ x 5-mil polyvinyl acetate film were treated as in Example 1 with cis-$N_2F_2$. The treated polyvinyl acetate was insoluble in boiling ethanol, whereas untreated polyvinyl acetate was completely soluble in boiling ethanol.

whereas the original untreated film was completely soluble in hot xylene.

EXAMPLE 12

Films of linear polyethylene and polypropylene were treated with $N_2F_2$ at 100° C. and atmospheric pressure for one hour in the apparatus of Example 1. The treated polyethylene film had a sticking temperature of 230° C. and was insoluble in hot xylene, whereas an untreated control had a sticking temperature of 115° C. and was readily soluble in hot xylene. The zero-strength temperature of the treated polypropylene film was 188° C., compared with a value of 155° C. for an untreated control. The treatment also improved the printability of the polypropylene film.

EXAMPLE 13

A skein of linear polyethylene yarn was treated with $N_2F_2$ by the method of Example 12. The treated yarn had a melting point, determined on a copper block, of 240° C. and was insoluble in hot xylene. An untreated control melted at 135° C. and was soluble in hot xylene.

EXAMPLE 14

Samples of paper made from linear polyethylene fibers were treated with $N_2F_2$ by the method of Example 12. The treated paper was insoluble in hot xylene and was higher-softening than an untreated control, which was soluble in hot xylene.

EXAMPLE 15

Films of an ethylene/carbon monoxide copolymer containing 88% by weight of combined ethylene were treated with $N_2F_2$ by the method of Example 12. The treatment rendered the films insoluble in xylene, whereas untreated controls were readily soluble.

EXAMPLE 16

A film of an ethylene/vinyl acetate copolymer containing 75% by weight of combined ethylene was treated with $N_2F_2$ by the method of Example 12. The treated film wis insoluble in hot xylene, whereas an untreated control was readily soluble.

EXAMPLE 17

A 3-mil film of an ethylene/propylene copolymer containing 50% by weight of combined ethylene and supported on aluminum foil was treated with $N_2F_2$ at 100° C. and atmospheric pressure for 15 minutes in the apparatus of Example 1. The treated film was completely insoluble in hot xylene, whereas an untreated control dissolved rapidly.

EXAMPLE 18

Two ⅓" x 3" x 1-mil films of polyvinyl alcohol were treated in the apparatus of Example 1 with $N_2F_2$ at 100° C. and atmospheric pressure for 50 minutes. A treated film was insoluble in hot water, whereas an untreated control was readily soluble. A treated film showed infrared absorption at $5.85\mu$, ascribable to

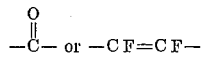

groups.

EXAMPLE 19

An acrylonitrile/methyl acrylate copolymer in the form of a powder containing 94% by weight of acrylonitrile was treated with $N_2F_2$ by the method of Example 12. The treated powder was insoluble in boiling dimethylformamide, whereas an untreated control dissolved readily.

EXAMPLE 20

A skein of elastomeric fibers of a polytetramethylene ether glycol (average M.W. 2000)/4,4'-diisocyanatodiphenylmethane/1,4-diaminopiperazine terpolymer (1:2:1 molar ratio) was treated with a mixture of $NF_3$ and $N_2F_2$ containing 90 mole percent $NF_3$ at 100° C. and atmospheric pressure for 10 minutes in the apparatus of Example 1. The treated fibers were less soluble in hot aqueous 88% phenol than an untreated control. When the treatment time was extended to 20 minutes and to 30 minutes, the degree of insolubilization became progressively greater.

Although in most of the examples film has been used, this is only for convenience. The treatment is equally applicable to other types of shaped polymer articles such as fibers, coatings, or massive articles. In the case of thick polymer objects, the modification is most pronounced at the surface.

Although the modification of polymers according to this invention is usually applied to shaped articles for the reason previously given, other forms of the polymer can be used. Thus, the nitrogen fluorides can be mixed with polymer in powder or flake form, alone or with other substances such as solvents, plasticizers, or fillers prior to the fabrication of shaped articles. Modification of the polymer can then take place, or be completed, while polymer articles are being shaped, by conventional methods either with or without heating, e.g., by spinning, casting, coating, extruding, molding, pressing, etc., methods. In one embodiment of this process, ntrogen fluorides can be absorbed on a filler such as carbon black, activated alumina, or molecular sieves. The filler is mixed with the polymer by a suitable method such as milling or ball-milling below such a temperature (i.e., 30° C.) that essentially no modification of the polymer takes place. The polymer mix is then formed into shaped objects and heated by any suitable method such as in a mold under pressure for sufficient time, e.g., at least one minute, to give cured articles.

The teratment with nitrogen fluorides in the gaseous state in accord with this invention is usually effected at subatmospheric or atmospheric pressures, but this is only for convenience and it is to be understood that superatmospheric pressures can also be used.

The time of the treatment depends upon the temperature, the concentration of the particular nitrogen fluoride employed, and the extent of modification desired, and upon the form of the polymer. Usually desirable effects are obtained in five minutes, but more extensive modification is realized in longer periods of exposure.

The modified polymers produced in accord with the process of this invention are insoluble or less soluble or swellable than the untreated polymers and/or have higher softening temperatures. These are important improvements and enhance the utility of the polymers. Thus, polymer fibers and films which have been treated according to this invention can be employed in uses, e.g., filters and wrapping films, which involve contact with organic solvents, or which involve temepratures above the zero-strength temperature of the untreated polymer.

The detailed description has been given for clearness of understanding only and no unnecessary limitations are to be understood therefrom. The invention is not limited to the exact details shown and described, for obvious modifications will occur to those skilled in the art.

The embodiments of the invention on which an exclusive property or privilege is claimed are defined as follows:

1. A process for modifying a polymer essentially free of monomer selected from the class consisting of polyethylene, polypropylene, copolymers of ethylene and carbon monoxide, copolymers of ethylene and vinyl monomers, polyvinyl acetate, polyvinyl alcohol, polyvinyl fluoride, polyacrylonitrile, copolymers of acrylonitrile and vinyl monomers, vinylidene fluoride/hexafluoropropylene copolymers, vinylidene fluoride/hexafluoropropylene/tetrafluoroethylene terpolymers, and polytetramethylene ether glycol/4,4'-diisocyanatodiphenylmethane/1,4 diaminopiperazine terpolymers, which comprises crosslinking it by treating said polymer with a nitrogen fluoride selected from the class consisting of dinitrogen difluoride, dinitrogen tetrafluoride and nitrogen fluorides of the formula

wherein $X_1$ and $X_2$ are selected from the class consisting, when taken separately, of fluorine and monovalent lower perfluorocarbyl radicals and, when joined together, of divalent lower perfluorocarbyl radicals.

2. A process for modifying a polymer of claim 1 which comprises crosslinking it by effecting contact between said polymer and from about 0.1% to about 10% by weight, based on the weight of the polymer, of a nitrogen fluoride of the group consisting of dinitrogen difluoride, dinitrogen tetrafluoride, and nitrogen fluorides of the formula

in which $X_1$ and $X_2$, when taken separately, are selected from the class consisting of flourine and monovalent lower perfluorocarbyl radicals, and when joined together, represent divalent lower perfluorocarbyl radicals, and thereafter subjecting the resulting mixture to a temperature above 0° C.

3. The process set forth in claim 1 in which the polymer and said nitrogen fluoride are heated to a temperature of from 0° up to about 200° C. for a period of at least 1 minute.

4. The process set forth in claim 1 in which the polymer and said nitrogen fluoride are subjected to a temperature above 0° C. until said polymer becomes substantially insoluble in organic solvents in which it was initially soluble.

5. The process set forth in claim 1 in which the subjection of the mixture of polymer and said nitrogen fluoride to a temperature above 0° C. is effected at a pressure below atmospheric pressure.

6. The process set forth in claim 1 in which the polymer is in the form of a film.

7. The process set forth in claim 1 in which the polymer is in the form of a fiber.

8. The process set forth in claim 1 in which the polymer is in the form of a tube.

9. The process set forth in claim 1 in which said polymer is polyethylene.

10. The process set forth in claim 1 in which said polymer is polyvinyl fluoride.

11. The process set forth in claim 1 in which said polymer is vinylidene fluoride/perfluoropropylene copolymer.

12. The process for increasing the softening temperature of polymer of claim 1 which comprises crosslinking it by treating said polymer with from about 0.1% to about 10% by weight, based on the weight of the polymer, of dinitrogen difluoride at a temperature within the range of 50° to 150° C.

13. The process for decreasing the solubility of polyvinyl fluoride essentially free of monomer which comprises crosslinking it by treating said polymer with from about 0.1% to about 10% by weight, based on the weight of the polymer, of dinitrogen difluorde at a temperature of from 50° to 150° C.

14. The process for strengthening and rendering 1,1-dfluoroethylene/hexafluoropropylene copolymer essentially free of monomer more elastic which comprises crosslinking it by treating said copolymer with from about 0.1% to 10% by weight, based on the weight of the copolymer, of dinitrogen difluoride, at a temperature of from 50° to 200° C.

15. The process set forth in claim 1 in which the nitrogen fluoride is dinitrogen difluoride.

16. A process for modifying a polymer of claim 1 which comprises crosslinking it by treating said polymer with a mixture of dinitrogen difluoride and an inert gas.

17. Polymers crosslinked in accordance with the process of claim 1.

References Cited in the file of this patent
UNITED STATES PATENTS
2,963,468     Cleaver _____ Dec. 6, 1960